United States Patent
Patel (10) Patent No.: US 9,579,949 B2
(45) Date of Patent: Feb. 28, 2017

(54) VEHICLE FUEL ECONOMY SYSTEM AND PROCESS THEREOF

(71) Applicant: Toyota Motor Engineering & Manufacturing North America, Inc., Erlanger, KY (US)

(72) Inventor: Tapan V. Patel, Lakewood, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/705,180

(22) Filed: May 6, 2015

(65) Prior Publication Data

US 2016/0325600 A1 Nov. 10, 2016

(51) Int. Cl.
*B60H 1/00* (2006.01)

(52) U.S. Cl.
CPC ..... *B60H 1/00735* (2013.01); *B60H 1/00878* (2013.01)

(58) Field of Classification Search
None
See application file for complete search history.

(56) References Cited

U.S. PATENT DOCUMENTS

| 6,175,782 B1 | 1/2001 | Obradovich et al. |
| 6,449,535 B1 | 9/2002 | Obradovich et al. |
| 8,774,999 B2 | 7/2014 | Takeda et al. |
| 8,827,171 B2 | 9/2014 | Choi et al. |
| 2009/0031741 A1* | 2/2009 | Hara ............... B60H 1/00735 62/239 |
| 2012/0158241 A1* | 6/2012 | Tate, Jr. ........... B60H 1/00392 701/36 |
| 2012/0222438 A1 | 9/2012 | Osaka et al. |
| 2016/0144689 A1* | 5/2016 | Miller ............ B60H 1/00764 165/202 |

FOREIGN PATENT DOCUMENTS

WO 03000513 A1 1/2003

* cited by examiner

*Primary Examiner* — Thomas Tarcza
*Assistant Examiner* — Garrett Evans
(74) *Attorney, Agent, or Firm* — Dinsmore & Shohl LLP (57) ABSTRACT

A fuel economy system for a vehicle. The vehicle has a power supply, an HVAC system that is operable to heat and/or cool an interior compartment of the vehicle, and a destination system that is operable to estimate a length of time or distance required for the vehicle to arrive at a destination on a predefined route. The system also includes an HVAC control system in communication with the HVAC system. The HVAC control system is operable to regulate a temperature of the vehicle interior compartment by increasing or decreasing power to the HVAC system such that the interior compartment is heated or cooled. The HVAC control system is also operable to automatically reduce power to the HVAC system per a predefined reduced power plan prior to the vehicle reaching the destination.

8 Claims, 6 Drawing Sheets

VEHICLE FUEL ECONOMY SYSTEM AND PROCESS THEREOF

FIELD OF THE INVENTION

The instant application is directed to a vehicle fuel economy system and a process for increasing fuel economy of a vehicle, and in particular to a fuel economy system and process that automatically reduces power to an HVAC system as the vehicle approaches a destination on a predefined route.

BACKGROUND OF THE INVENTION

Vehicles with heating, ventilation, and air conditioning (HVAC) systems are known. Such systems provide comfort to one or more individuals within a passenger/interior compartment of the vehicle. In addition, such HVAC systems use power/energy to operate and are known to reduce fuel economy of the vehicle during their operation.

An individual typically turns on (energizes) the heater or air conditioner of such an HVAC system when they begin traveling in the vehicle to a workplace, a grocery store, a sporting event, and the like. It is also not uncommon for the individual to turn on the heater or air conditioner and leave it turned on for the length of the trip. Stated differently, and even though the heater or air conditioner may not be needed during the final portion of the trip, individuals typically forget to turn off the heater or air conditioner until arriving at a desired destination. Therefore, a system and/or process that automatically reduces power to an HVAC system within a vehicle that is traveling along a predefined route and as it approaches its destination would improve fuel economy of the vehicle and be desirable.

SUMMARY OF THE INVENTION

An increased fuel economy system for a vehicle is provided. The vehicle has a power supply, an HVAC system that is operable to heat and/or cool an interior compartment of the vehicle, and a destination system that is operable to estimate a length of time required for the vehicle to arrive at a destination of a predefined route. The system also includes an HVAC control system in communication with the HVAC system and the HVAC control system is operable to change or regulate a temperature of the interior compartment by increasing or decreasing power to the HVAC system such that the interior compartment is heated or cooled.

The HVAC control system, which may or may not include an electronic control unit (ECU), is configured to automatically reduce power to the HVAC system per a predefined reduced power plan as the vehicle approaches the destination. The predefined reduced power plan can be a step function reduction of power, a linear reduction of power, an exponential reduction of power and/or a power law reduction in power to the HVAC system before the vehicle reaches the destination.

The HVAC control system can include a manual override such that the manual override alters the automatic reduction of power to the HVAC system as the vehicle approaches the destination. In some instances, the HVAC control system has a learning module and the learning module is configured to receive an increase and/or decrease power signal from the manual override and alter the predefined reduced power plan as a function thereof. Stated differently, the HVAC control system can learn from an individual's behavior with respect to desired operation of the HVAC system and alter the predefined reduced power plan as a function thereof.

A process for increasing vehicle fuel economy includes providing a vehicle with the power supply, HVAC system, HVAC control system, and destination system described above. The vehicle is operated and travels to a destination on a predefined route. In addition, the HVAC system is activated during traveling to the destination using the HVAC control system. An estimated time to arrival at the destination is determined using the destination system and the HVAC system has power thereto automatically reduced when the estimated time to arrival reaches a predetermined value. As such, power to the HVAC system is reduced before the vehicle arrives at the destination which improves fuel economy for the vehicle when compared to normal or typical operation of the HVAC system until the vehicle arrives at the destination.

DETAILED DESCRIPTION OF THE INVENTION

A fuel economy system for a vehicle and a process for increasing fuel economy for the vehicle is provided. The vehicle has a power supply such as an internal combustion engine, a hybrid electrical-internal combustion engine, an electrical motor, and the like affords for the vehicle to travel from one location to another location. The vehicle also has an HVAC system that is operable to heat or cool an interior compartment of the vehicle.

A destination system is also included and is operable to estimate a length of time required for the vehicle to arrive at a destination on a predefined route. Any destination system known to those skilled in the art can be part of the fuel improvement system as can future destination systems not yet developed. Illustrative destination systems currently known to those skilled in the art and can include a vehicle-based global positioning system (GPS) system, a portable electronic device (PED)-based GPS system, a vehicle-based road marker-detector system, a PED-based road marker-detector system, and a vehicle-based visualization system.

It is appreciated that GPS systems use satellite signals to determine where a GPS is located on the earth's surface and can be used to select a predefined route to a desired destination, provide directions along the predefined route, and estimate a time of arrival at the destination. The time of arrival can be calculated from an estimated length or distance from a current position of the GPS device to the destination divided by an average speed of the vehicle where the GPS device is located.

A vehicle-based road marker-detector system can include a plurality of road markers along a predefined route and a detector on a vehicle that counts or recognizes such road markers and can determine how many markers remain until the destination is arrived at. In addition, given the number of markers remaining on the predefined route to the destination, the vehicle-based road marker-detector system can estimate the distance to the destination and divide the distance by an average speed of the vehicle in order to determine an estimated time of arrival. Such a system can be included with a PED.

The vehicle-based visualization system can include a camera and object detection system that can detect known objects along a predefined route and based on detection of such known objects estimate a distance remaining to the destination. The distance remaining to the destination can then be divided by an average speed of the vehicle in order to provide an estimated time to arrival.

The fuel economy system includes an HVAC control system that is in electrical or electronic communication with the HVAC system. The HVAC control system is operable to change or regulate a temperature within the interior compartment of the vehicle by maintaining, increasing or decreasing power to the HVAC system. In this manner, the interior compartment is heated or cooled. In addition, the power to the HVAC system is provided by the power supply for the vehicle. As such, it is appreciated that when the HVAC system is heating or cooling the interior compartment of the vehicle, the operation of the HVAC system uses power from the vehicle power supply, which in turn reduces the fuel economy of the vehicle.

In order to improve the fuel economy of the vehicle, the HVAC control system is configured to automatically reduce power to the HVAC system per a predefined reduced power plan or logic as the vehicle approaches the destination. Stated differently, and based on the estimated time of arrival to the destination, the HVAC control system reduces power to the HVAC system, the reduction of power resulting in increased fuel economy for the vehicle.

The HVAC control system can have a manual override such that an individual traveling in the vehicle can prevent or alter the automatic reduction of power to the HVAC system as the vehicle approaches the destination. As such, if the HVAC control system automatically reduces power to the HVAC system such that the change in regulated temperature of the interior compartment occurs too soon or too late along the predefined route, a user of the vehicle can override the automatic reduction of power to the HVAC system to meet their personal comfort needs.

The fuel economy system can also include an electronic control unit (ECU) with a learning module that can receive instructions or settings to the HVAC control system using the manual override and subsequently alter or revise a predefined reduced power plan. In this manner, the HVAC control system can learn habits of an individual that travels in the vehicle in order to provide a revised predefined reduced power plan that better suits the needs and/or comfort of the individual.

The predefined reduced power plan can be a step function reduction of power, a linear reduction of power, an exponential reduction of power, a power law reduction in power, and combinations thereof. As such, an individual can have a customized reduction in power for the HVAC system and thus a customized termination of heating or cooling of the interior compartment of the vehicle in order to meet their specific comfort needs and/or desire to improve fuel economy.

The process for increasing fuel economy includes providing the vehicle with the HVAC system, HVAC control system, and destination system discussed above. An individual can operate the vehicle, or the vehicle can be an autonomous vehicle, and the vehicle travels along a predefined route to a desired destination. Along the route the HVAC system is activated in order to heat or cool the interior of the vehicle. As the vehicle travels to the destination, an estimated time of arrival is determined and upon reaching a predefined value for the estimated time of arrival, the HVAC control system automatically reduces power to the HVAC system. With the reduction of power to the HVAC system, the fuel economy of the vehicle improves for the remainder of the predefined route.

Figure 1:
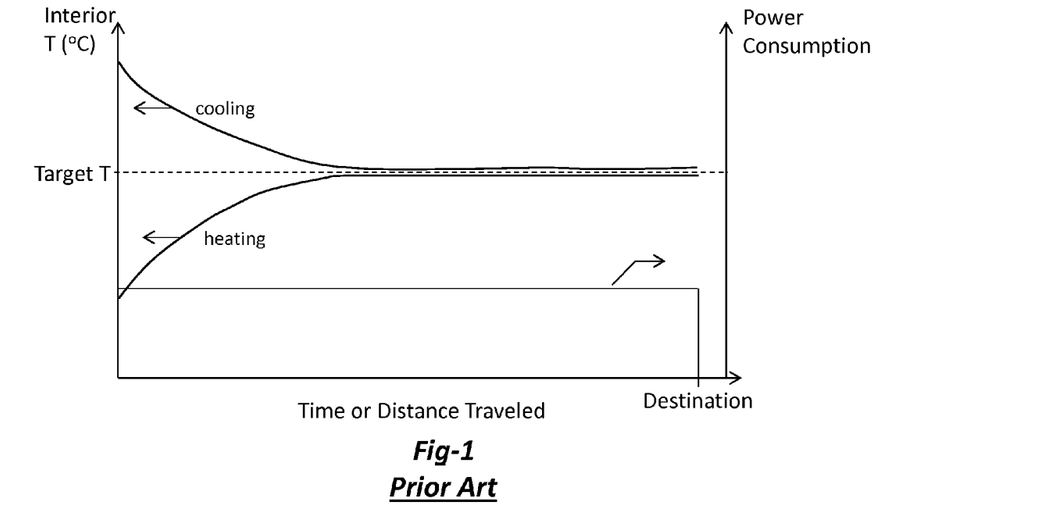
FIG. 1 is a graphical illustration of the vehicle interior compartment temperature and HVAC power consumption during heating or cooling of the vehicle interior compartment as the vehicle travels to a destination for an embodiment known in the prior art.

Turning now to FIG. 1, a graphical illustration for a prior art HVAC system and HVAC control system is shown. In particular, the temperature of an interior compartment of the vehicle and power consumption by the HVAC system versus time or distance traveled by the vehicle is shown. In addition, the X axis has a predetermined destination that would be on a predefined route or known to occur at a predefined travel time for the vehicle. One of the arcuate curves on the graph illustrates temperature during cooling of the interior compartment, e.g. during operation of an air conditioner that is part of the HVAC system. As shown by the cooling curve, the initial temperature of the interior compartment is initially relatively high and then gradually cools until a target temperature or target temperature range within the interior compartment is reached. Finally, a generally straight and horizontal line represents the power consumed by the HVAC system during traveling of the vehicle to the destination.

As shown in FIG. 1, the power consumed by the HVAC system is steady and is terminated once the vehicle reaches the destination. It is appreciated that the line representing the power consumed can vary with time or distance traveled, e.g. if a user changes an HVAC blower/fan speed, changes a temperature setting for the interior compartment, and the like. However, it is also appreciated that HVAC system remains "on" until the vehicle arrives at the destination.

Similar behavior is shown for heating of the interior compartment, i.e. the initial temperature of the interior compartment is relatively low, and upon operation of a heater the temperature gradually increases until a target temperature or targeted temperature range is reached. Again, the power consumption is relatively steady until the vehicle reaches the destination and then it is terminated. It should be appreciated that the target temperature is shown to be the same for both cooling and heating of the interior compartment, however this is not required.

Figure 2:
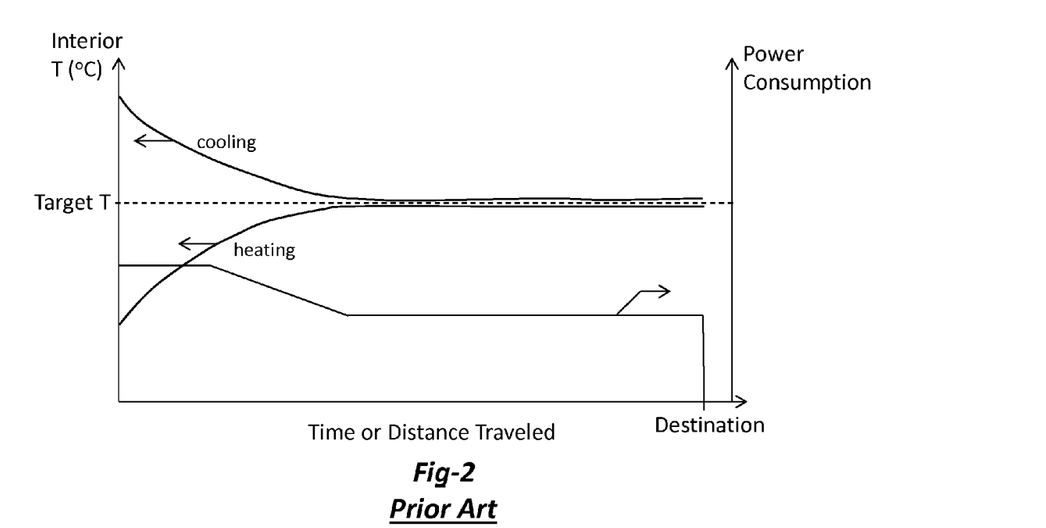
FIG. 2 is a graphical illustration of the vehicle interior compartment temperature and HVAC power consumption during heating or cooling of the vehicle interior compartment as the vehicle travels to a destination for another embodiment known in the prior art.

Another embodiment of a prior art system is shown in FIG. 2 with the same heating and cooling curves illustrated in FIG. 1. However, different power consumption behavior is illustrated as a function of distance and/or temperature of the interior compartment. In particular, power consumption by the HVAC system is relatively high until the interior compartment temperature reaches or approaches the target temperature or temperature range, and then the power consumption levels off to a steady state value. Once the vehicle has reached the destination, power to the HVAC system is terminated and power consumption drops to zero.

Figure 3:
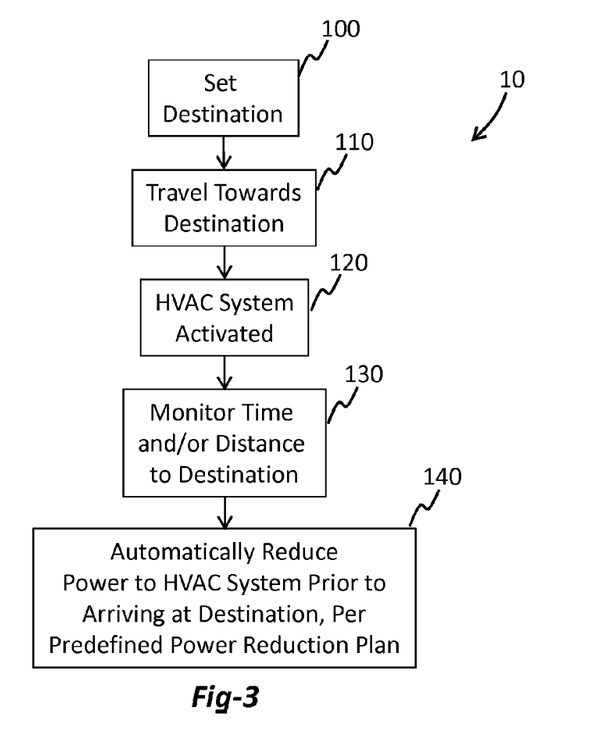
FIG. 3 is a schematic illustration of a process according to an embodiment disclosed herein.

In the alternative to such prior art systems, FIG. 3 provides a schematic illustration of an inventive process at reference numeral 10. The process 10 includes setting a destination at step 100 in which to travel using a vehicle with an inventive fuel economy system as disclosed herein. The vehicle travels towards the destination at step 110 and the HVAC system is activated at step 120. It is appreciated that the HVAC system can be activated before the vehicle actually starts to travel or move towards the destination, or in the alternative be activated after or once the vehicle proceeds towards the destination. The process includes monitoring a time of arrival and/or distance to the destination at step 130. Once the time and/or distance left to the destination reaches a predetermined value, power to the HVAC system is automatically reduced per a predefined power reduction plan at step 140.

Figure 4:
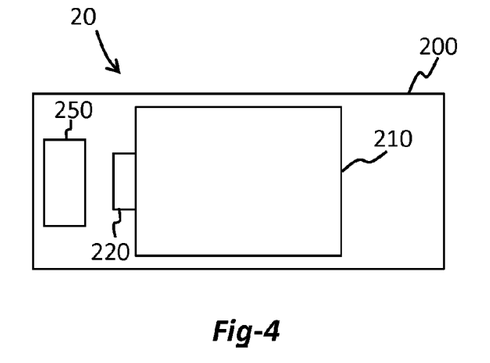
FIG. 4 is a schematic illustration of a system according to an embodiment disclosed herein.

FIG. 4 illustrates a fuel economy system according to an embodiment disclosed herein at reference numeral 20. The system 20 includes a vehicle 200 with an interior compartment 210, an HVAC system 220, and a power supply 250. The HVAC system 220 has an HVAC control system 230 which is shown in detail in FIG. 5. The HVAC control system includes a heater 232, an air conditioner 234, a blower 236, and one or more control knobs, switches, etc. 238. The HVAC control system 230 also includes an ECU 240 which may or may not have memory 242 and a processing unit 244. It is appreciated that the various components 232-238 are in electrical communication with the ECU 240 and can thus be activated, i.e. energized, de-energized, and the like, as is known to those skilled in the art.

Figure 5:
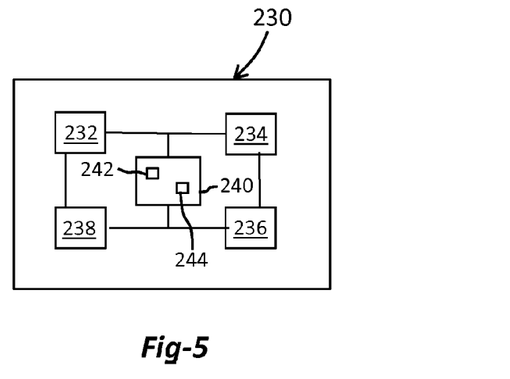
FIG. 5 is a schematic illustration of an HVAC control system according to an embodiment disclosed herein.
Figure 6:
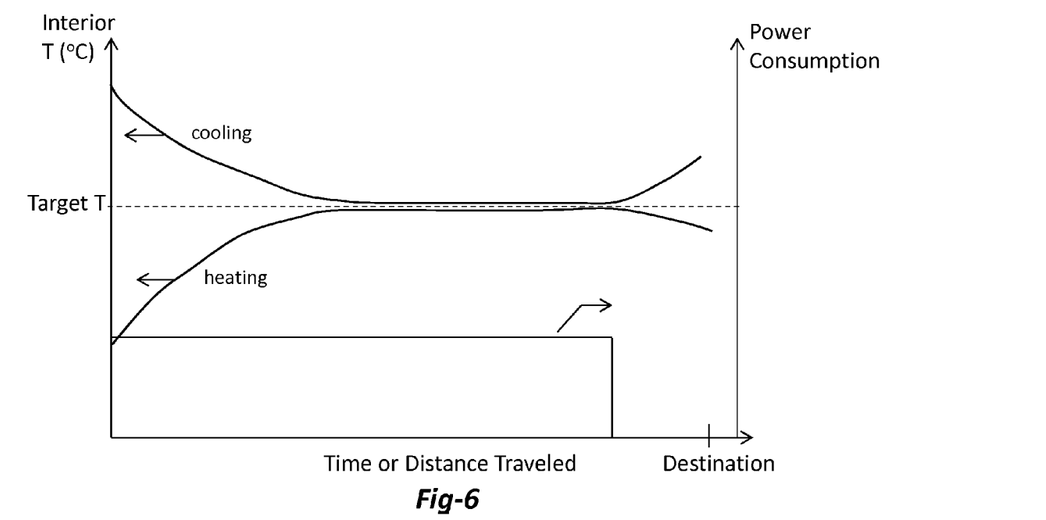
FIG. 6 is a graphical illustration of the vehicle interior compartment temperature and HVAC power consumption during heating or cooling of the vehicle interior compartment as the vehicle travels to a destination according to an embodiment disclosed herein.

Using such a process as shown in FIG. 3 and/or a system as shown in FIGS. 4 and 5, FIG. 6 provides a graphical illustration of the process and use of the system according to an embodiment disclosed herein. In particular, FIG. 6 is a graphical plot of interior temperature for the interior compartment 210 of the vehicle 200 and power consumption by the HVAC system 220 as a function of time or distance traveled by the vehicle 200. Also shown on the horizontal axis is a time or distance representative of a destination for the vehicle. The heating and cooling curves shown in FIG. 6 are similar to the curves shown in FIGS. 1 and 2 except for the fact that prior to arriving at the destination, the power consumption to the HVAC system is terminated and the interior compartment 210 of the vehicle 200 begins to either cool down or heat up. As shown in the figure, by terminating the power supplied to the HVAC system prior to reaching the destination, the change in temperature of the interior compartment 210 can either rise or fall, but still be within comfortable user limits. Stated differently, a user of the vehicle may not notice an interior compartment discomfort after the power has been reduced to the HVAC system prior to arrival at the destination. In the alternative, a user may notice a slight change in temperature of the interior compartment but still be satisfied with such a change due to increased fuel economy.

It is appreciated that the reduction in power supply to the HVAC system shown in FIG. 6 is a step function reduction of power. It should also be appreciated that the step function reduction of power shown in the figure appears to go to zero power consumption, however this is not required. For example, the power consumption could be reduced to 75% of normal consumption, 50%, 25%, etc., just so long as the power consumption is reduced automatically by the HVAC control system 230 prior to the vehicle reaching its destination. It is appreciated that the term "normal" refers to typical manual operation of the HVAC system by an individual.

Figure 7:
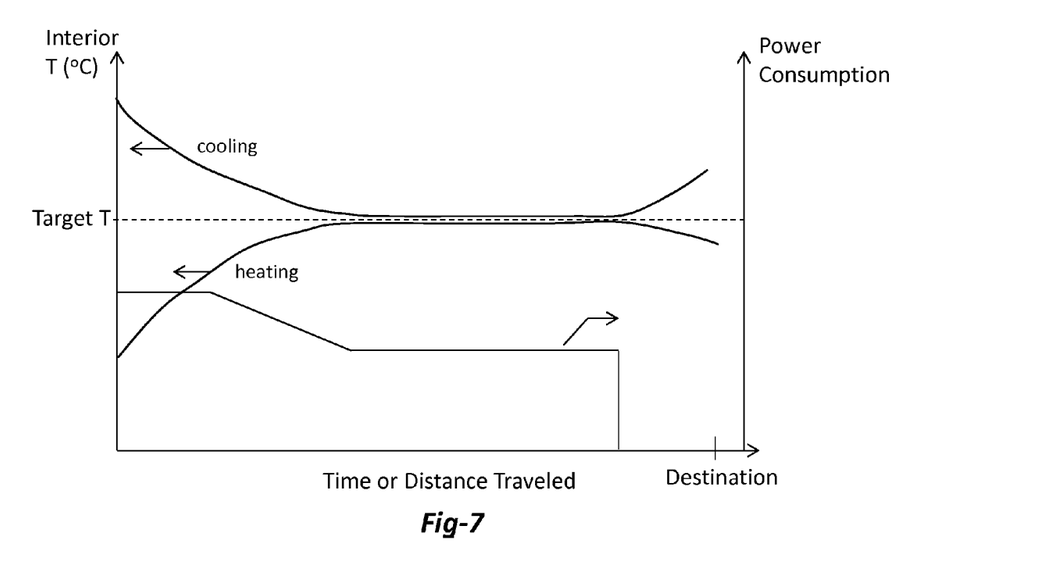
FIG. 7 is a graphical illustration of the vehicle interior compartment temperature and HVAC power consumption during heating or cooling of the vehicle interior compartment as the vehicle travels to a destination according to another embodiment disclosed herein.

FIG. 7 shows a graphical illustration similar to FIG. 2 in that the power consumption by the HVAC system decreases once the heating or cooling curves approach the target temperature of the interior compartment and then has a step function reduction in power. In addition, the reduction in power to the HVAC system is similar to that discussed in reference to FIG. 6 above.

Figure 8:
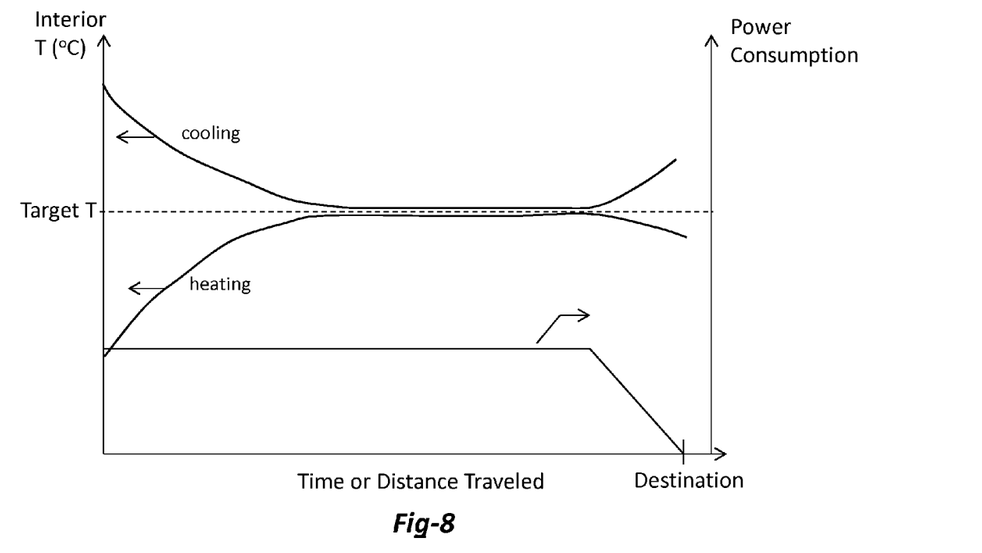
FIG. 8 is a graphical illustration of the vehicle interior compartment temperature and HVAC power consumption during heating or cooling of the vehicle interior compartment as the vehicle travels to a destination according to another embodiment disclosed herein.
Figure 9:
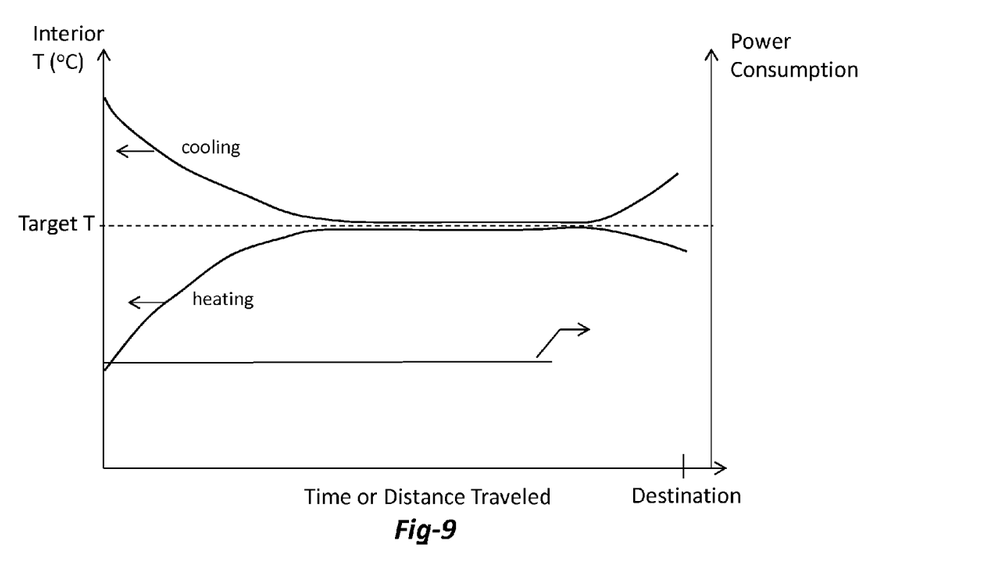
FIG. 9 is a graphical illustration of the vehicle interior compartment temperature and HVAC power consumption during heating or cooling of the vehicle interior compartment as the vehicle travels to a destination according to another embodiment disclosed herein.
Figure 10:
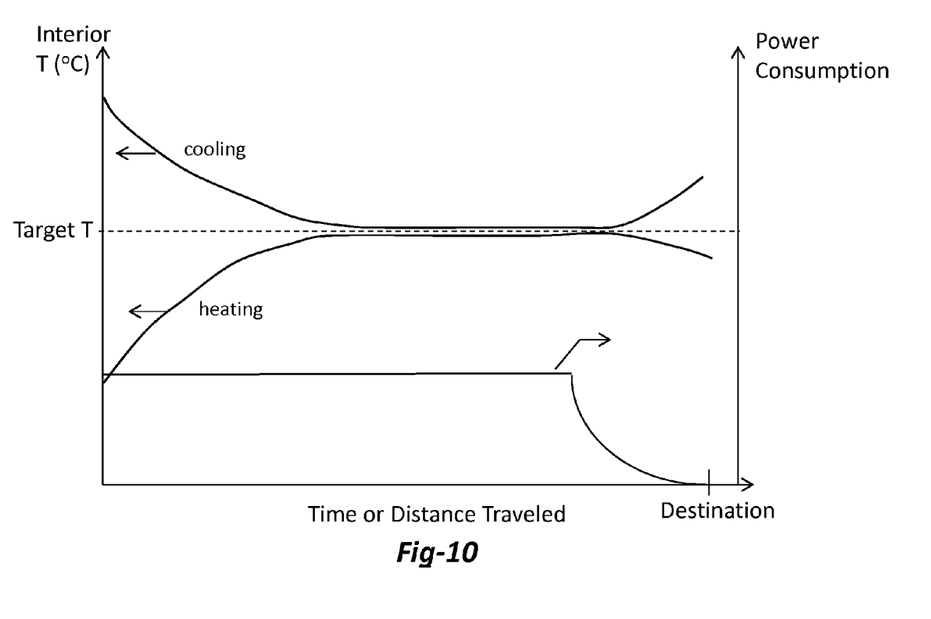
FIG. 10 is a graphical illustration of the vehicle interior compartment temperature and HVAC power consumption during heating or cooling of the vehicle interior compartment as the vehicle travels to a destination according to another embodiment disclosed herein.

Turning now to FIG. 8, a graphical illustration of another embodiment disclosed herein is provided in which the power consumption is linearly reduced once a predetermined time or distance to arrival has been reached by the vehicle traveling to the destination. FIG. 9 illustrates an embodiment with a power law reduction in power and FIG. 10 illustrates an exponential reduction in power to the HVAC system before the vehicle reaches the destination.

Figure 11:
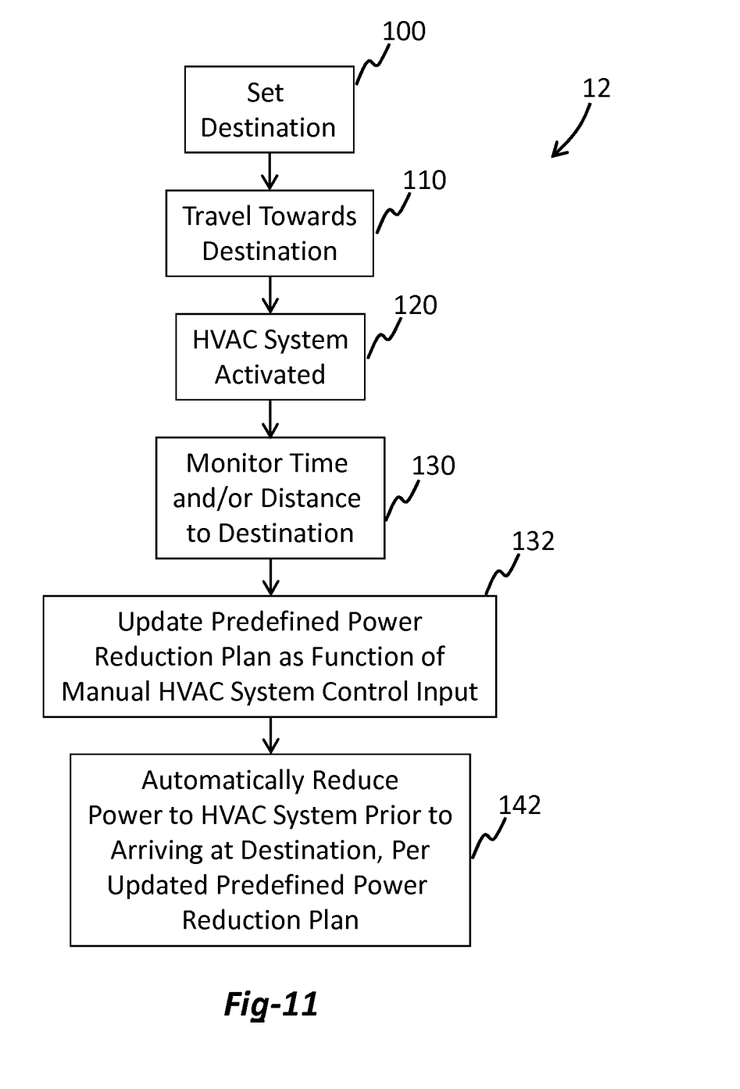
FIG. 11 is a schematic illustration of a process according to an embodiment disclosed herein.

It is appreciated that a user of the vehicle using the manual override can alter the automatic reduction in power and the system can then modify the predefined reduced power plan for future operation. FIG. 11 provides a schematic illustration for such a process at reference numeral 12. In particular, the predefined power reduction plan is updated or revised as a function of manual HVAC system control input at step 132 per a learning module, e.g. within the ECU 240. The predefined power reduction plan can be modified to reduce power sooner or later with respect to the vehicle reaching the destination, at a faster rate or slower rate, and the like. At step 142, the HVAC control system automatically reduces power to the HVAC system prior to arriving at the destination per the updated predefined power reduction plan. In this manner, a vehicle having the inventive system can have increased fuel economy while still providing desired comfort for an individual traveling within the vehicle.

The power to the HVAC system can be automatically reduced per the predefined reduced power plan at any time or location prior to reach the destination. For example, a redefined reduced power plan can reduce power to the HVAC system at an estimated time of arrival of 1 minute, 3 minutes, 5 minutes, 10 minutes, etc. In the alternative, the predefined reduced power plan can reduce power to the HVAC system at an estimated distance to arrival of 0.5 miles, 1 mile, 2 miles, 5 miles, etc. The HVAC control system is also configured to reduce power as a function of an estimated decrease or increase in temperature from a time when power is reduced to an estimated time of arrival at the destination. For example, the HVAC control system and/or a predefined reduced power plan can account for a given increase or decrease in interior compartment temperature per a unit of time when the HVAC system is not operating, and then reduce power to the HVAC system such that the increase or decrease in temperature of the interior compartment does not exceed 2° C., 5° C., etc.

It is appreciated that the above embodiments, examples, etc. are provided for illustrative and teaching purposes only and are not meant to limit the scope of the invention in any way. As such, changes, modifications, and the like will be evident to those skilled in the art and yet still fall within the scope of the invention. It is the claims, and all equivalents thereof, which define the scope of the invention.

I claim:

1. A fuel economy system, said fuel economy system comprising:
   a vehicle having a power supply, an interior compartment, an HVAC system operable to heat or cool said interior compartment of said vehicle and a destination system operable to estimate a length of time for said vehicle to arrive at a destination on a predefined route;
   an HVAC control system in communication with said HVAC system, said HVAC control system operable to regulate a temperature of said interior compartment by regulating power to said HVAC system and heating or cooling said interior compartment, said power to said HVAC system provided by said power supply; and
   said HVAC control system configured to automatically reducing power to said HVAC system per a predefined reduced power plan selected from at least one of an exponential reduction of power plan and a power law reduction in power plan as said vehicle approaches said destination, reducing power to said HVAC system before said vehicle reaches said destination increasing fuel economy for said vehicle.

2. The fuel economy system of claim 1, wherein said destination system is selected from at least one of a vehicle-based GPS system, a PED-based GPS system, a vehicle-based road marker-detector system, a PED-based road marker-detector system and a vehicle-based visualization system.

3. The fuel economy system of claim 2, wherein said HVAC control system has a manual override, said manual override altering said automatic reducing power to said HVAC system as said vehicle approaches said destination.

4. The fuel economy system of claim 3, wherein said HVAC control system has a learning module, said learning module configured to receive a manual increase or decrease power signal to said HVAC system and alter said predefined reduced power plan of automatically reducing power to said HVAC system as said vehicle approaches said destination.

5. A process for increasing vehicle fuel economy, the process comprising:
   providing a vehicle with a power supply, an HVAC system, an HVAC control system and a destination system, the destination system operable to estimate a length of time for the vehicle to arrive at a destination of a predefined route;
   operating the vehicle and traveling to the destination on the predefined route;
   activating the HVAC system during traveling to the destination using the HVAC control system;
   determining an estimated time to arrival at the destination using the destination system;
   automatically reducing power to the HVAC system per a predefined reduced power plan selected from at least one of an exponential reduction of power plan and a power law reduction in power plan when the estimated time reaches a predetermined value such that the power to the HVAC system is reduced before the vehicle arrives at the destination, reducing the power to the HVAC system when the estimated time reaches the predetermined value increasing the fuel economy of the vehicle.

6. The process of claim 5, wherein the destination system is selected from at least one of a vehicle-based GPS system, a PED-based GPS system, a vehicle-based road marker-detector system, a PED-based road marker-detector system and a vehicle-based visualization system.

7. The process of claim 6, wherein the HVAC control system has a manual override, the manual override altering the automatically reducing power to the HVAC system as the vehicle approaches the destination.

8. The process of claim 7, wherein the HVAC control system has a learning module, the learning module configured to receive a manual increase or decrease power signal to the HVAC system and alter a predefined reduced power plan of automatically reducing power to the HVAC system as the vehicle approaches the destination.

* * * * *